Patented July 17, 1928.

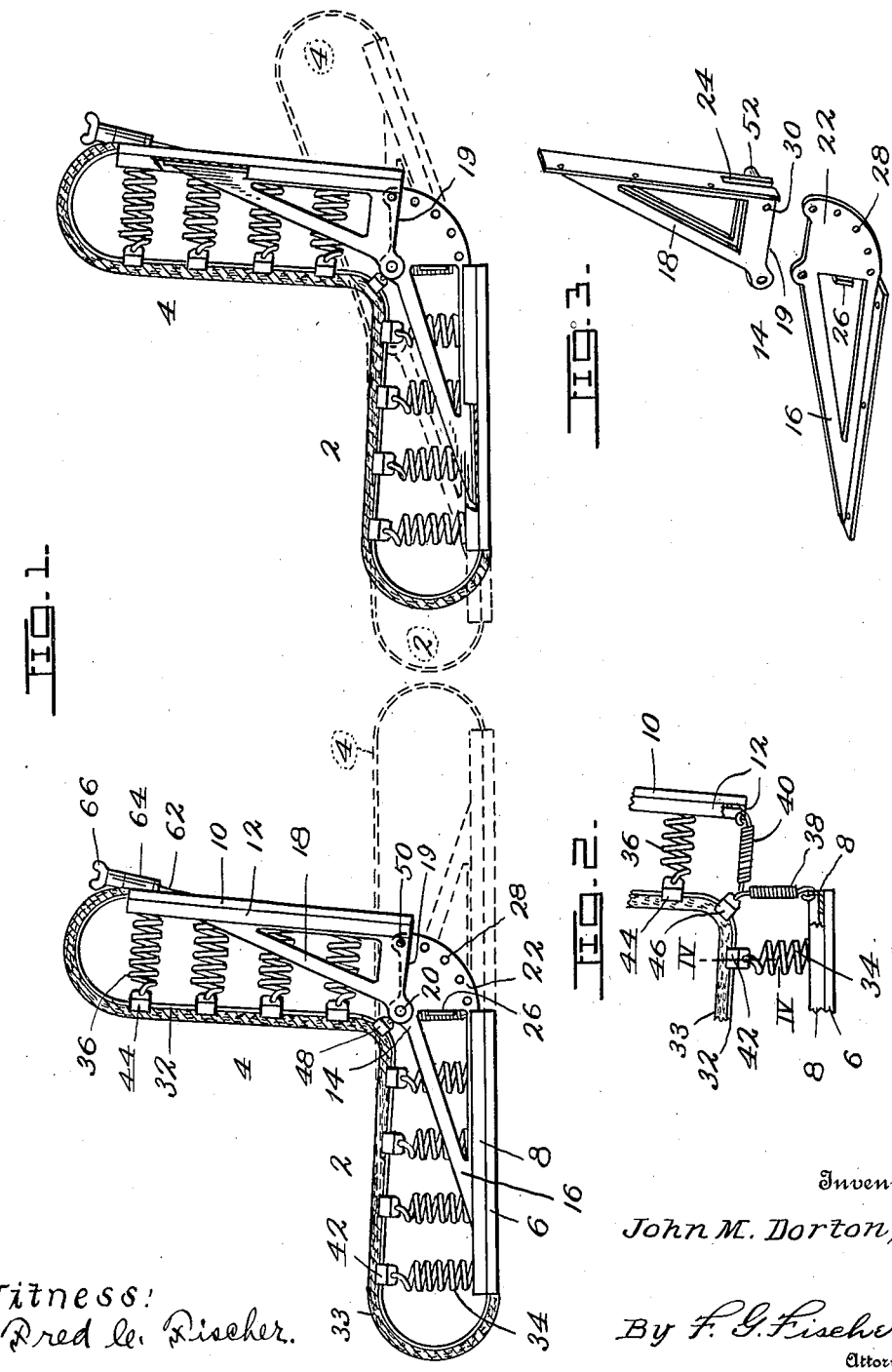

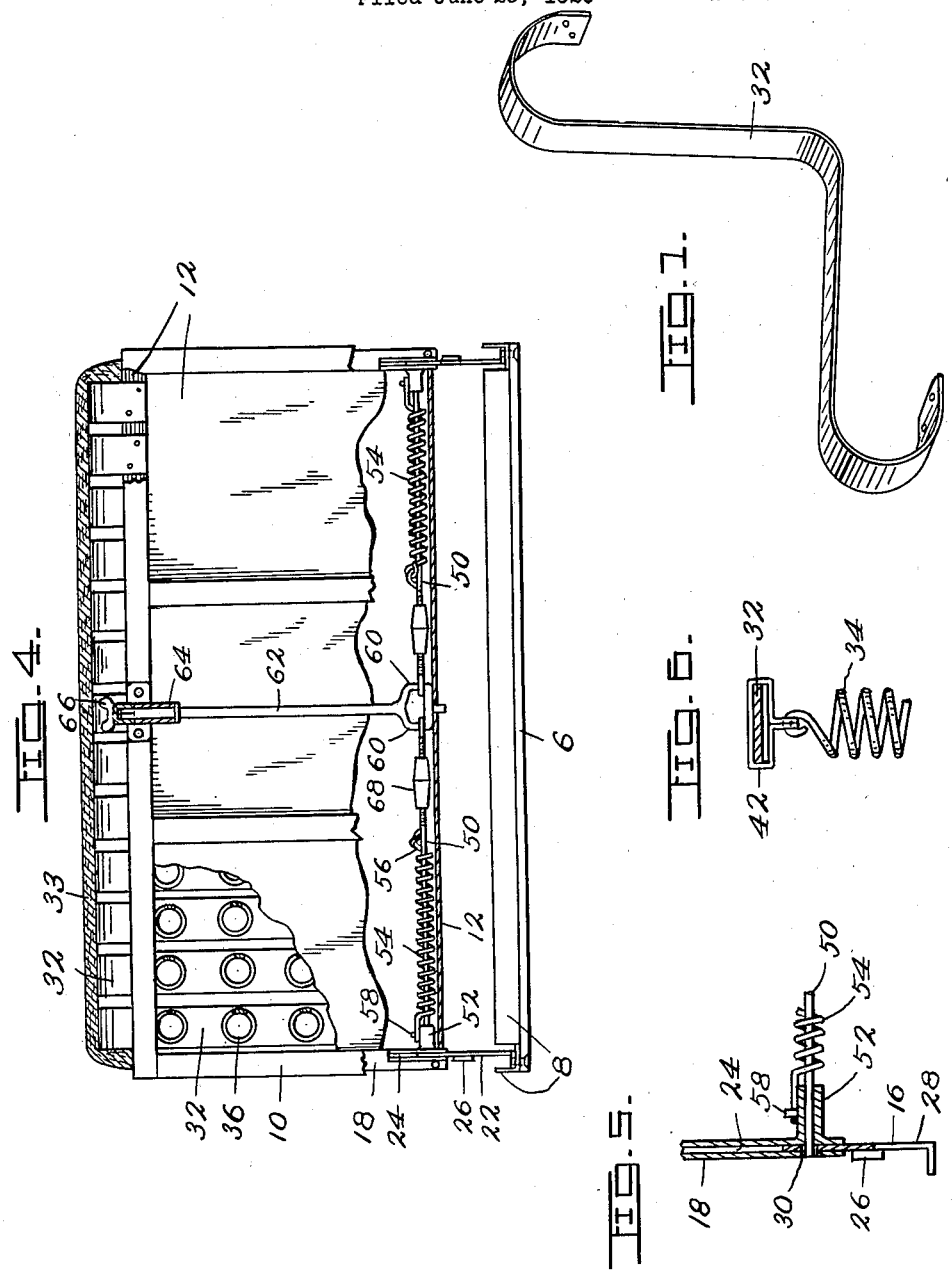

1,677,434

UNITED STATES PATENT OFFICE.

JOHN M. DORTON, OF BONNER SPRINGS, KANSAS.

ADJUSTABLE SEAT.

Application filed June 29, 1925. Serial No. 40,375.

My invention relates to seats which may be employed to advantage as porch seats, automobile seats, etc., and one object is to provide a seat with a back which may be adjusted to different inclinations, or adjusted to a horizontal position so that two adjacent seats can be converted into a comfortable bed.

A further object is to provide a device of this character in which the upper surface of the seat and the forward surface of the back move up and down together and hence will not wrinkle the back of the coat or partially pull the back of the shirt from the trousers of the occupant.

Other objects will hereinafter appear, and in order that the invention may be fully understood reference will now be had to the accompanying drawings, in which:

Fig. 1 is a side elevation of two seats arranged for use in a motor vehicle, the backs being lowered in dotted lines to indicate how the seats can be converted into a bed and the upholstery being partly broken away to show the springs and other interior parts.

Fig. 2 is a fragmentary side elevation partly in section, of a portion of one seat and its back.

Fig. 3 is a detail perspective view of a pair of hinge members dissembled and two pairs of which are employed to adjustably connect the back of the seat.

Fig. 4 is a rear elevation partly in section of one of the devices with some of the parts removed.

Fig. 5 is an enlarged fragmentary vertical section of one pair of the hinge members and a bolt for securing the same in adjusted positions.

Fig. 6 is an enlarged fragmentary cross section on line VI—VI of Fig. 2.

Fig. 7 is a detail perspective view of a strip or ribbon of resilient material which constitutes a portion of the seat and the back.

Referring now in detail to the different parts, 2 in general, designates the seat and 4 the adjustable back. The seat 2 embodies a rectangular frame 6 reinforced at its upper margin by a hollow rectangular frame 8. The back 4 is similar in construction to the seat 2 and embodies a rectangular frame 10 reinforced by a hollow rectangular frame 12. The frame 12 is adjustably connected to the frame 8 by two pairs of hinges 14.

Each pair of hinges consists of a member 16 firmly secured to each end of the frame 8, and a hinge 18 connected to each hinge member 16 by a pivot 20 and secured to each end of the frame 12. Each hinge member 16 has a segmental rear end 22 which projects into a slot 24 in the hinge member 18 and has a stop 26 against which the end 19 of the hinge member 18 abuts when the back 4 is lowered to a horizontal position as shown by dotted lines on the front seat, Fig. 1. Each segmental rear end 22 has spaced apertures 28 with which an aperture 30 at a lower portion of the associate hinge member 18 is adapted to register, for a purpose which will hereinafter appear, as the back 4 is raised or lowered.

32 designates a plurality of strips or ribbons of resilient metal secured at their lower and upper ends to the frames 6 and 10, respectively. Said strips 32 form portions of the seat 2 and the back 4 and are yieldably held in proper relation to the frames 6 and 10 by coil springs 34 and 36, and 38 and 40, respectively. The coil springs 34 are secured at their lower ends to the frame 6 and at their upper ends to loops 42 which embrace the strips 32, as best shown by Figs. 1, 2 and 6. The springs 36 are secured at their rear ends to the frame 10 and at their forward ends to the loops 44 which are similar to the loops 42 and like the same embrace the strips 32. The coil springs 38 are secured at their lower ends to the rear portion of the frame 8 and at their upper ends to loops 46 which embrace alternate strips 32. The coil springs 40 are secured at their rear ends to the lower portion of the frame 12 and at their forward ends to loops 48 loosely embracing the strips 32 not embraced by the loops 46. The strips 32 are covered by suitable upholstery 33.

The back 4 is secured at any point of its adjustment by a pair of oppositely-extending bolts 50, the outer ends of which are adapted to project through the associate apertures 28 and 30 when each of the latter registers with one of each of the former. The outer ends of the bolts 50 are supported by guides 52 on the lower portions of the hinge members 18 and in line with the apertures 30. The bolts 50 are urged towards the apertures 28 and 30 by coil springs 54 secured at their ends to eyes 56 on said bolts 50 and pins 58 on the guides 52.

The inner or adjacent ends of the bolts 50 are loosely connected to cranks 60 on the lower portion of a shaft 62 journaled at its lower portion in the lower end of the frame 12 and at its upper portion in a bearing 64 secured to the portion of said frame 12. The shaft 62 has a rectangular upper terminal for the reception of a key 66 whereby said shaft 62 may be rotated against the action of the springs 54 to withdraw the bolts 50 from the apertures 30 and 28. Each bolt 50 is made in two sections and connected by a turn-buckle 68, Fig. 4, so that it may be adjusted to the proper length to insure its entering the associate apertures 28 and 30.

With the parts constructed and arranged as shown and described, it is apparent that when one or more of the seats are installed in an automobile the seat and back portions of the strips 32 will move up and down simultaneously with an occupant of the seat as the car runs over obstructions in the road. By thus moving up and down together the seat and back portions of the strips 32 will not cause the coat of the occupant to wrinkle or pull the shirt from the trousers, an inconvenience which is common to the ordinary type of seats in which the back and seat cushions are not connected and move up and down more or less independently of each other. It is also apparent that the back 4 of either seat may be readily adjusted to different inclinations by withdrawing the bolts 50 from the apertures 28 and 30 and then secured in adjusted position by releasing the key 66 so that the springs 54 may adjust the bolts 60 to active position. The loops 42 and 44 loosely embrace the strips 32, as shown by Fig. 6, so that said strips may slide longitudinally in said loops and thus avoid undue bending of the springs 34 which in turn would prevent free longitudinal movement of the strips.

While I have shown and described the preferred construction, combination and arrangement of parts, I reserve the right to make such changes and modifications as properly fall within the spirit and scope of the invention as claimed.

Having thus described my invention, what I claim and desire to secure by Letters Patent, is:

1. A device of the character described consisting of seat and back frames, flexible strips spaced apart and secured to said frames, loops loosely embracing each of said strips to permit longitudinal movement of the latter, and coil springs connected to said loops and the frames.

2. A device of the character described consisting of seat and back frames hinged together at their adjacent ends, flexible strips secured at their ends to the forward portion of the seat frame and the upper portion of the back frame, loops loosely embracing said strips near the hinged ends of said frames, and springs connected at one end to the hinged ends of said frames and at their opposite end to said loops.

In testimony whereof I affix my signature.

JOHN M. DORTON.